United States Patent
Giang et al.

(10) Patent No.: US 7,403,936 B2
(45) Date of Patent: Jul. 22, 2008

(54) OPTIMIZING DATABASE ACCESS FOR RECORD LINKAGE BY TILING THE SPACE OF RECORD PAIRS

(75) Inventors: Phan H. Giang, Downingtown, PA (US); Sathyakama Sandilya, Malvern, PA (US); William A. Landi, Devon, PA (US); R. Bharat Rao, Berwyn, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 386 days.

(21) Appl. No.: 11/067,992

(22) Filed: Feb. 28, 2005

(65) Prior Publication Data
US 2005/0246318 A1 Nov. 3, 2005

Related U.S. Application Data

(60) Provisional application No. 60/550,454, filed on Mar. 5, 2004.

(51) Int. Cl.
*G06F 17/30* (2006.01)
*G06F 15/16* (2006.01)
(52) U.S. Cl. .................. 707/2; 707/1; 707/100
(58) Field of Classification Search .......... 707/1–2
See application file for complete search history.

(56) References Cited

U.S. PATENT DOCUMENTS

| | | | | |
|---|---|---|---|---|
| 5,237,669 A | * | 8/1993 | Spear et al. ............. | 711/2 |
| 5,680,611 A | * | 10/1997 | Rail et al. ............... | 707/101 |
| 6,373,139 B1 | * | 4/2002 | Clark ...................... | 257/774 |
| 7,051,097 B1 | * | 5/2006 | Pecina .................... | 709/224 |

OTHER PUBLICATIONS

Kao et al., "Simple and Efficient Graph Compression Schemes for Dense and Complement Graphs", Journal of Combinatorial Optimization, Dec. 1998, Springer-Verlag, vol. 2, No. 4, p. 451-459.*
Article entitled "Tailor: a record linkage toolbox", by Elfeky M. G. et al.; IEEE Comp. Soc. US, vol. Conf. 18, Feb. 26, 2002, pp. 17-28.
Article entitled "The Merge/Purge Problem for Large Databases"by Hernandez M.A., et al., Sigmod Record, vol. 24, No. 2, Jun. 1995, pp. 127-138.
Articled entitled "PC-Filter: A Robust Filtering Technique For Duplicate Record Detection in Large Databases"by Ji Zhang et al., Database and Expert Systems Application, 15th International Conference, Dexa 2004, pp. 486-496.
Article entitled "Record Matching: Past, Present and Future" by Cochinwala M., et al., Online, http://citeseer.csail.mit.edu/cache/papers/cs/27621/http:zSzzSzwww.cs.nyu.eduzSzcszSzfacultySzshashashazSzpaperszSzverykiios085.pdf/record-matching-past-present.
Article entitled "Join Processing in Relational Databases", by Mishra P. et al., Computing Surveys USA, vol. 24, No. 1, Mar. 1992, pp. 63-113.

* cited by examiner

*Primary Examiner*—Tony Mahmoudi

(57) ABSTRACT

A system and method for optimizing database access for record linkage by tiling the space of record pairs are provided, the system including a processor, a segmentation and pairing unit in signal communication with the processor for segmenting database data into data segments and pairing the data segments into data quadrants, and a duplicate detection unit in signal communication with the processor for detecting duplicates for each quadrant; and the method including receiving database data, segmenting the database data into data segments, pairing the data segments into data quadrants, and detecting duplicates for each quadrant.

8 Claims, 2 Drawing Sheets

OPTIMIZING DATABASE ACCESS FOR RECORD LINKAGE BY TILING THE SPACE OF RECORD PAIRS

CROSS-REFERENCE TO RELATED APPLICATION

This application claims the benefit of U.S. Provisional Application Ser. No. 60/550,454, filed Mar. 5, 2004 and entitled "Optimizing Database Access for Record Linkage by Tiling the Space of Record Pairs", which is incorporated herein by reference in its entirety.

BACKGROUND

Record linkage for a database is the problem of finding pairs or sets of records that represent the same entity. For a large database that does not fit entirely into a random access memory, comparison of all possible pairs of records involves many database readings to bring data records that need to be compared into the memory. This can be an inefficient and time-consuming operation.

In previously considered techniques, each database reading would load those records into memory that were to be compared, such as those records that had the same blocking key value. There are several disadvantages of such methods. One disadvantage is that the number of such blocks is large and therefore the number of required database readings is great. Another disadvantage is that block sizes can vary in a wide range. For small blocks, this method leads to the waste of memory resources. For blocks that are too large, it leads to out-of-memory errors.

Accordingly, it is desirable to optimize database access for record linkage.

SUMMARY

These and other drawbacks and disadvantages of the prior art are addressed by an exemplary system and method for optimizing database access for record linkage by tiling the space of record pairs.

An exemplary system for optimizing database access for record linkage by tiling the space of record pairs includes a processor, a segmentation and pairing unit in signal communication with the processor for segmenting database data into data segments and pairing the data segments into data quadrants, and a duplicate detection unit in signal communication with the processor for detecting duplicates for each quadrant.

An exemplary method for optimizing database access for record linkage by tiling the space of record pairs includes receiving database data, segmenting the database data into data segments, pairing the data segments into data quadrants, and detecting duplicates for each quadrant.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for optimizing database access for record linkage by tiling the space of record pairs in accordance with the following exemplary figures, in which.

DETAILED DESCRIPTION OF PREFERRED EMBODIMENTS

A tiling technique to minimize database readings in record linkage is provided, including optimizing database access for record linkage by tiling the space of record pairs. The tiling technique divides the record linkage or duplicate detection problem for a large database into a number of record linkage problems for smaller databases that can each be loaded entirely into memory. This technique minimizes the number of database readings and narrows the range of block sizes to maximize the efficient use of memory resources and avoid out-of-memory errors.

Exemplary embodiments of the present disclosure minimize the number of database readings while guarantying that any pair of records will be available in the memory for a period of time. In addition, the embodiments stabilize and maximize the number of records to be read into memory for each reading.

Figure 1:
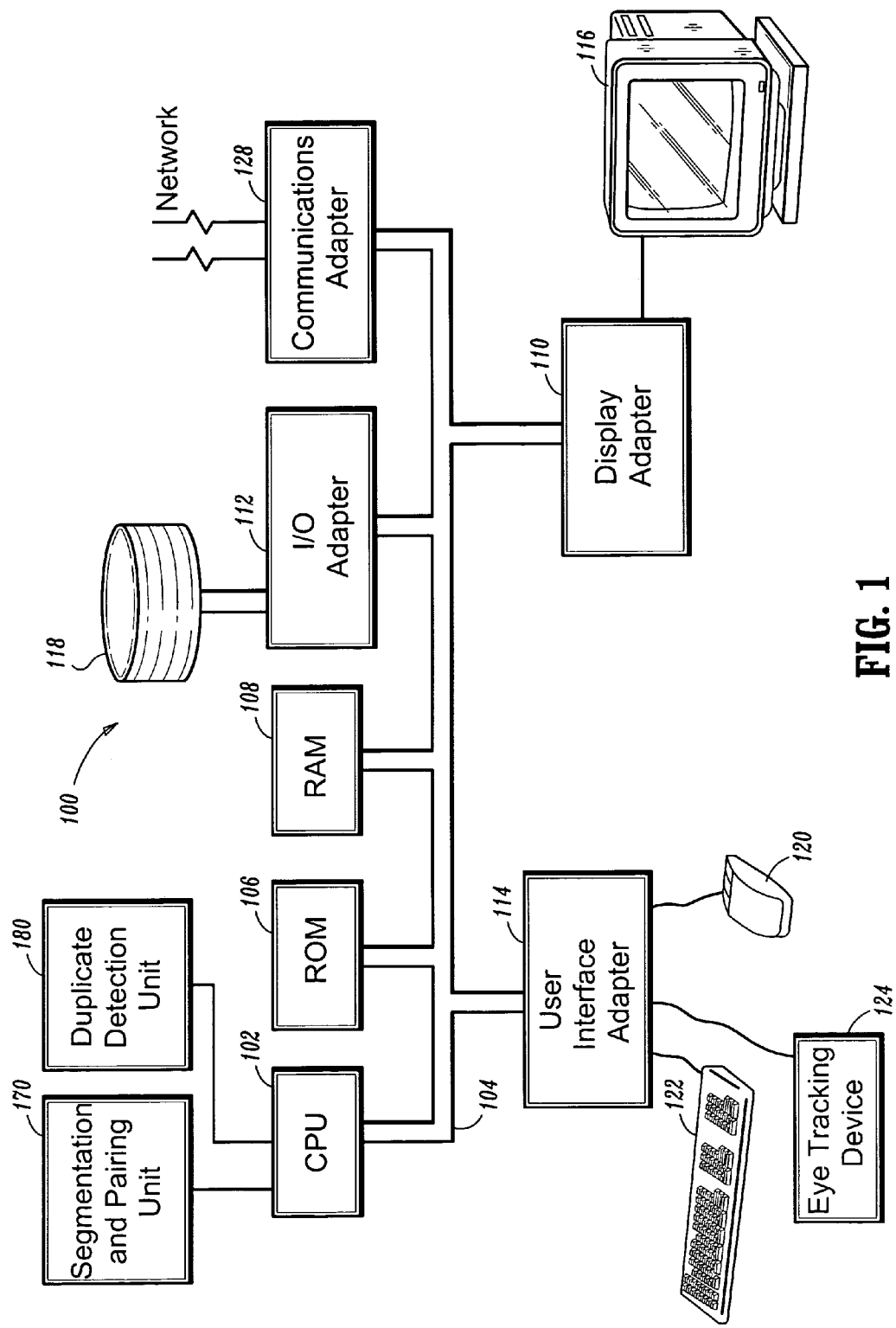
FIG. 1 shows a schematic diagram of a system for optimizing database access for record linkage by tiling the space of record pairs in accordance with an illustrative embodiment of the present disclosure.

As shown in FIG. 1, a system for optimizing database access for record linkage by tiling the space of record pairs, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, and a communications adapter 128 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114.

A segmentation and pairing unit 170 and a duplicate detection unit 180 are also included in the system 100 and in signal communication with the CPU 102 and the system bus 104. While the segmentation and pairing unit 170 and the duplicate detection unit 180 are illustrated as coupled to the at least one processor or CPU 102, these components are preferably embodied in computer program code stored in at least one of the memories 106, 108 and 118, wherein the computer program code is executed by the CPU 102.

Figure 2:
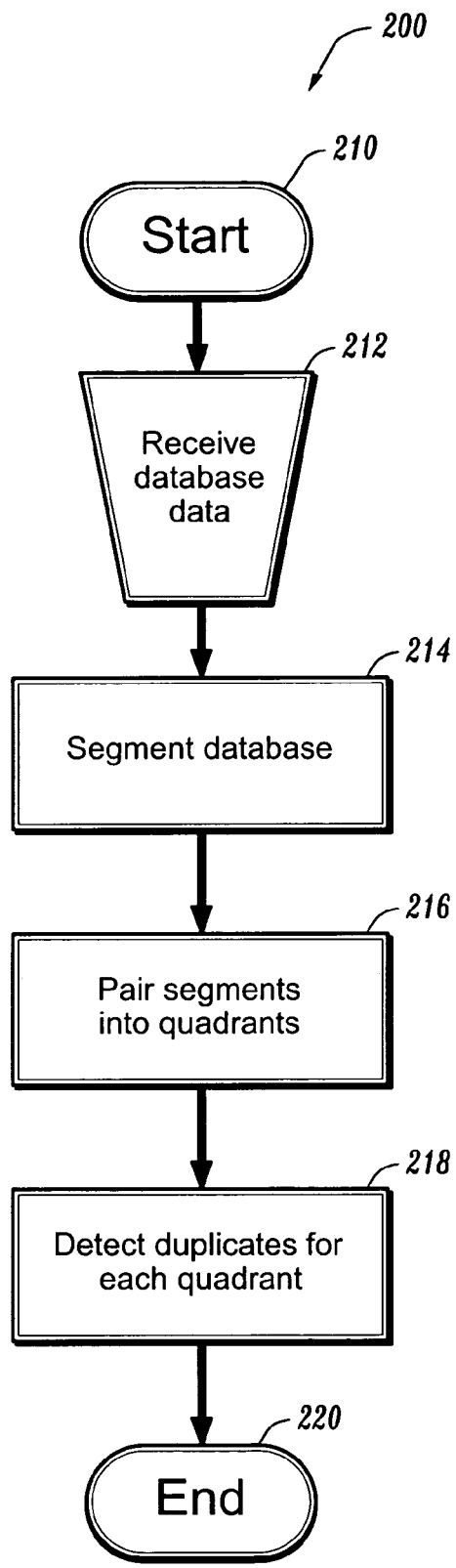
FIG. 2 shows a flow diagram of a method for optimizing database access for record linkage by tiling the space of record pairs in accordance with an illustrative embodiment of the present disclosure.

Turning to FIG. 2, a method for optimizing database access for record linkage by tiling the space of record pairs, according to an illustrative embodiment of the present disclosure, is indicated generally by the reference numeral 200. The method 200 includes a start block 210 that passes control to an input block 212. The input block 212 receives database data and passes control to a function block 214. The function block 214 segments the database data and passes control to a function block 216. The function block 216, in turn, pairs the segments into quadrants and passes control to a function block 218. The function block 218 Detects duplicates for each quadrant and passes control to an end block 220.

In operation, this technique allows a break of a big task or job of record linkage into many smaller jobs or quadrants. Each of the quadrants fits entirely into the RAM of a processing unit. Thus, quadrants may be processed sequentially on one CPU or in parallel on separate CPUs.

A large database is divided into a number s of non-intersecting and substantially equal segments. The number of records in a segment is determined on the basis of two parameters: (1) the memory capacity, and (2) the size of records; so that 2 segments can be loaded into memory. The division criterion is chosen so that segment reading into memory is the most efficient. For example, segments are determined by record ID ranges.

From s segments, s(s−1)/2 pairs of segments will be formed. Each pair, which is called a quadrant, is formed by joining segment number i with segment number j such that i<j.

For each quadrant, a duplicate detection is performed. In short, the duplication detection job on a database of N records is divided into s(s−1)/2 jobs of duplicate detection for databases of 2N/s records. Each of those jobs requires 2 database readings. The order of processing the jobs can be arranged so that the number of database readings for all (s(s−1)/2) quadrants is (s(s−1)/2+1). An example of such an order is as follows: (1,2) (1,3) . . . (1,s) (2,s) (2,s−1) . . . (2,3) (3,4) (3,5) . . . (s−1,s). This is the minimum number of database readings to do to guarantee that any pair of N records will be found in the memory at the same time.

The processing of quadrants varies slightly from one to another. For the quadrant of segment (1,2), all pairs are considered. Within each quadrant, not all considered pairs are actually compared. A pair must satisfy a condition before it would be compared. That is, two records are compared only if they have the same blocking key. Here, a blocking key is a set of pre-specified indices, and a blocking key value of a record is a string of characters at those specified positions. For the quadrant (1,i), a pair of two records will be considered if either (1) one record is in segment 1 and the other record is in segment i or (2) both records are in segment i. For quadrant (i, j) j>i>1, two records will be considered if one record is in segment i and the other record is in segment j. This variation ensures that any pair from N records will be considered in one and only one quadrant.

Thus, superior performance of this preferred technique is achieved by (1) minimizing the number of database readings, (2) maximally utilizing the available memory capacity, and (3) ensuring that no record pair is compared twice.

In alternate embodiments of the apparatus 100, some or all of the computer program code may be stored in registers located on the processor chip 102. In addition, various alternate configurations and implementations of the segmentation and pairing unit 170 and the duplicate detection unit 180 may be made, as well as of the other elements of the system 100.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for optimizing database access for record linkage by tiling the space of record pairs, the method comprising:

receiving database data;

segmenting the database data into data segments;

pairing the data segments into data quadrants; and detecting duplicates for each quadrant, wherein a number of segment pairs formed from s number of the data segments is s(s−1)/2 segment pairs or data quadrants, and wherein detecting duplicates on a database of N records is divided into s(s−1)/2 jobs of duplicate detection for databases of 2N/s records, such that each of those jobs makes two database readings.

2. A method as defined in claim 1 wherein an order of processing the jobs is arranged such that a number of database readings for all (s(s−1)/2) quadrants is (s(s−1)/2+1), which is a minimum number of database readings to guarantee that any pair of the N records will be found in the memory at a same time.

3. A method as defined in claim 2 wherein an order of processing quadrant jobs is: (1,2) (1,3) . . . (1,s) (2,s) (2,s−1) . . . (2,3) (3,4) (3,5) . . . (s−1,s).

4. A method for optimizing database access for record linkage by tiling the space of record pairs, the method comprising:

receiving database data;

segmenting the database data into data segments;

pairing the data segments into data quadrants; and detecting duplicates for each quadrant, comprising:

considering all pairs for the quadrant of segment (1,2);

considering a pair of two records for the quadrant (1,i) if one record is in segment 1 and the other record is in segment i or if both records are in segment i; and considering a pair of two records for the quadrant (i,j), where j>i>1, if one record is in segment i and the other record is in segment j, wherein any pair from N records will be considered in one and only one quadrant.

5. A system for optimizing database access for record linkage by tiling the space of record pairs, the system comprising:

at least one processor;

a segmentation and pairing unit in signal communication with the at least one processor for segmenting database data into data segments and pairing the data segments into data quadrants; and a duplicate detection unit in signal communication with the at least one processor for detecting duplicates for each quadrant, the duplicate detection unit comprising means for detecting duplicates on a database of N records by dividing the task into s(s−1/2 jobs of duplicate detection for databases of 2N/s records, such that each of those jobs makes two database readings.

6. A system as defined in claim 5, the duplicate detection unit comprising means for ordering processing of the jobs such that a number of database readings for all (s(s−1)/2) quadrants is (s(s−1)/2+1), which is a minimum number of database readings to guarantee that any pair of the N records will be found in the memory at a same time.

7. A system as defined in claim 6, the duplicate detection unit comprising means for ordering processing of the quadrant jobs as: (1,2) (1,3) . . . (1,s) (2,s) (2,s−1) . . . (2,3) (3,4) (3,5) . . . (s−1,s).

8. A system for optimizing database access for record linkage by tiling the space of record pairs, the system comprising:

at least one processor;

a segmentation and pairing unit in signal communication with the at least one processor for segmenting database data into data segments and pairing the data segments into data quadrants; and a duplicate detection unit in signal communication with the at least one processor for detecting duplicates for each quadrant, the duplicate detection unit comprising means for detecting duplicates for each quadrant comprising:

means for considering all pairs for the quadrant of segment (1,2);

means for considering a pair of two records for the quadrant (1,i) if one record is in segment 1 and the other record is in segment i or if both records are in segment i; and means for considering a pair of two records for the quadrant (i,j), where j>i>1, if one record is in segment i and the other record is in segment j, wherein any pair from N records will be considered in one and only one quadrant.

* * * * *